(12) United States Patent
Vokkarne et al.

(10) Patent No.: US 11,381,404 B2
(45) Date of Patent: Jul. 5, 2022

(54) TRUSTED PLATFORM MODULE ATTESTATION FLOW OVER SIMPLE AUTHENTICATION AND SECURITY LAYER WITH MULTIPLE SYMMETRIC KEY IDENTIFICATION

(71) Applicant: Microsoft Technology Licensing LLC, Redmond, WA (US)

(72) Inventors: Rajeev Mandayam Vokkarne, Sammamish, WA (US); Jelani Zukar Brandon, Woodinville, WA (US); Simon Porter, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 795 days.

(21) Appl. No.: 16/185,065

(22) Filed: Nov. 9, 2018

(65) Prior Publication Data
US 2020/0153642 A1 May 14, 2020

(51) Int. Cl.
*H04L 9/32* (2006.01)
*H04L 9/30* (2006.01)
*H04L 69/329* (2022.01)

(52) U.S. Cl.
CPC .............. *H04L 9/3271* (2013.01); *H04L 9/30* (2013.01); *H04L 9/3234* (2013.01); *H04L 69/329* (2013.01)

(58) Field of Classification Search
CPC ....... H04L 9/3271; H04L 9/30; H04L 9/3234; H04L 69/329; H04L 2209/127;
(Continued)

(56) References Cited

U.S. PATENT DOCUMENTS

| 9,750,083 B2* | 8/2017 | Gidlund | H04W 12/033 |
| 2004/0027999 A1* | 2/2004 | Casaccia | H04W 4/06 370/335 |

(Continued)

OTHER PUBLICATIONS

"Enable TPM Auth Over AMQP for Provisioning", Retrieved from: https://github.com/Azure/azure-iot-sdk-java/commit/438ffd4f73b44a8c382779390a5f9f814612341b?short_path=efda765#diff-efda765179adccd676d0b66adfef5cle, Jan. 18, 2018, 37 Pages.

(Continued)

*Primary Examiner* — Sanchit K Sarker
(74) *Attorney, Agent, or Firm* — Mark K. Young; Mayer & Williams, PC

(57) ABSTRACT

An existing Simple Authentication and Security Layer (SASL) framework is modified to overcome message size limitations by implementing a control byte that enables segmentation of SASL messages. In implementations in which client computing devices utilize a trusted platform module (TPM) for enhanced security, the client computing device can transmit multiple public keys and other information to a provisioning service during an attestation process. This information can be segmented across multiple messages while leveraging the SASL framework. A control byte may be utilized in each message and define attributes about the respective messages, such as whether a current message is an interim or final message segment. Likewise, the provisioning service can divide a challenge key into multiple segments and include a control byte for each segment. The control byte within segmented messages enables utilization of the TPM public keys and thereby can leverage the heightened security provided by the TPM.

20 Claims, 14 Drawing Sheets

(58) Field of Classification Search
CPC ... H04L 9/0877; H04L 63/0876; G06F 21/35; H04W 12/06
USPC .......................................................... 713/171
See application file for complete search history.

(56) References Cited

U.S. PATENT DOCUMENTS

| | | | | |
|---|---|---|---|---|
| 2011/0138458 A1* | 6/2011 | Kumar | ................... | H04L 63/18 709/227 |
| 2011/0258305 A1* | 10/2011 | Chen | ................... | H04L 67/142 709/223 |
| 2012/0216244 A1* | 8/2012 | Kumar | ................... | G06F 21/57 726/1 |
| 2015/0188944 A1* | 7/2015 | Dyer | ................... | H04L 63/0876 726/3 |
| 2015/0229619 A1* | 8/2015 | Costa | ................... | G06F 21/445 713/171 |
| 2018/0241572 A1* | 8/2018 | Miele | ................... | G06F 21/57 |

OTHER PUBLICATIONS

"International Search Report and Written Opinion Issued in PCT Application No. PCT/US2019/059289", dated Feb. 5, 2020, 14 Pages.

"AMQP v1.0", Retrieved from: http://www.amqp.org/sites/amqp.org/files/amqp.pdf, Oct. 7, 2011, 113 Pages.

"Mocana, Xilinx, Avnet, Infineon & Microsoft Join Forces to Secure Industrial Control and IoT Devices", Retrieved from: https://web.archive.org/web/20171110014624/https:/www.ebnonline.com/document.asp?doc_id=283098, Nov. 9, 2017, 4 Pages.

"Securing the Internet of Things: A Proposed Framework", Retrieved from: https://web.archive.org/web/20160316065342/https:/www.cisco.com/c/en/us/about/security-center/secure-iot-proposed-framework.html, Mar. 16, 2016, 11 Pages.

Anusha M, et al., "Performance Analysis Of Data Protocols Of Internet Of Things: A Qualitative Review", In International Journal of Pure and Applied Mathematics, vol. 115, No. 6, Oct. 15, 2017, pp. 37-46.

Betts, et al., "Control access to IoT Hub", Retrieved from: https://docs.microsoft.com/en-us/azure/iot-hub/iot-hub-devguide-security#security-tokens, Jul. 18, 2018, 19 Pages.

Gantait, et al., "Securing IoT devices and gateways", Retrieved from: https://www.ibm.com/developerworks/library/iot-trs-secure-iot-solutions1/index.html, May 16, 2016, 40 Pages.

Grawrock, David, "Using the tpm with iot", Retrieved from: https://trustedcomputinggroup.org/wp-content/uploads/JRF-WS-Dec2015_2.-TPM-and-IOt.pdf, Retrieved Date: Aug. 24, 2018, pp. 1-20.

Gupta, Rahul, "Things to Know About MQTT—The Protocol for Internet of Things", Retrieved from: https://www.ibm.com/developerworks/community/blogs/5things/entry/5_things_to_know_about_mqtt_the_protocol_for_internet_of_things?lang=en_us, Sep. 23, 2014, 4 Pages.

Patierno, Paolo, "AMPQ Essentials", Retrieved from: https://dzone.com/refcardz/amqp-essentials?chapter=1, Retrieved Date: Aug. 24, 2018, 6 Pages.

Vaster, et al., "AMQP 1.0 in Azure Service Bus and Event Hubs protocol guide", Retrieved from: https://docs.microsoft.com/en-us/azure/service-bus-messaging/service-bus-amqp-protocol-guide, Apr. 30, 2018, 32 Pages.

* cited by examiner

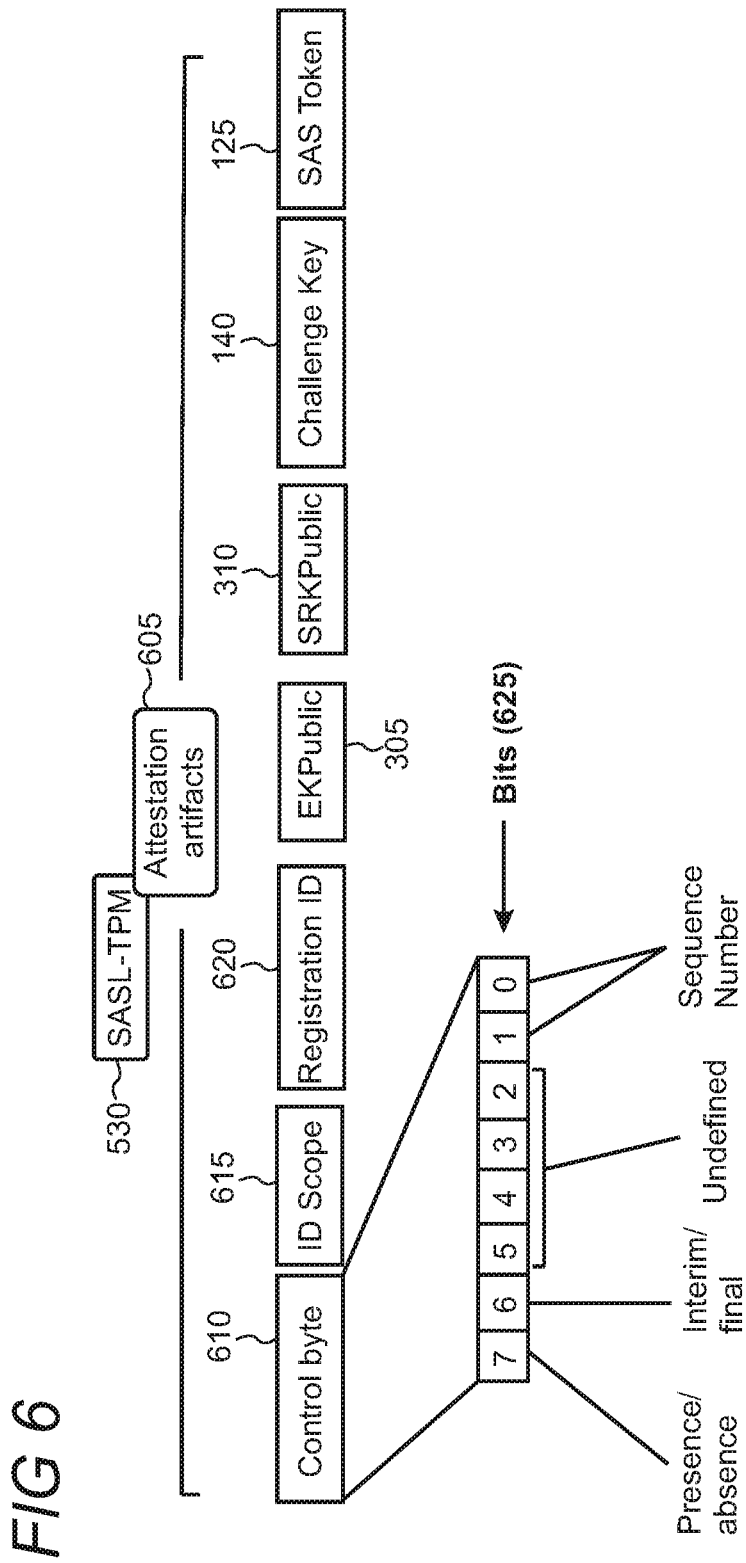

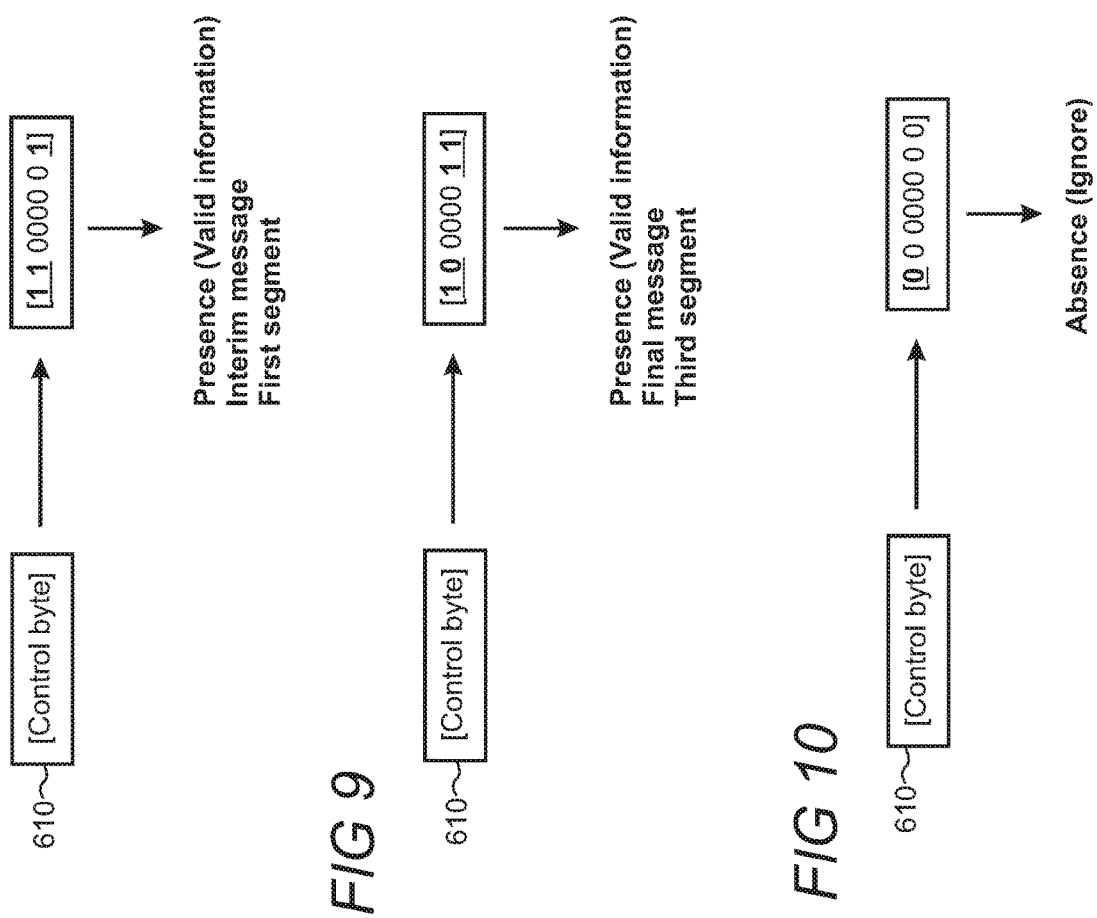
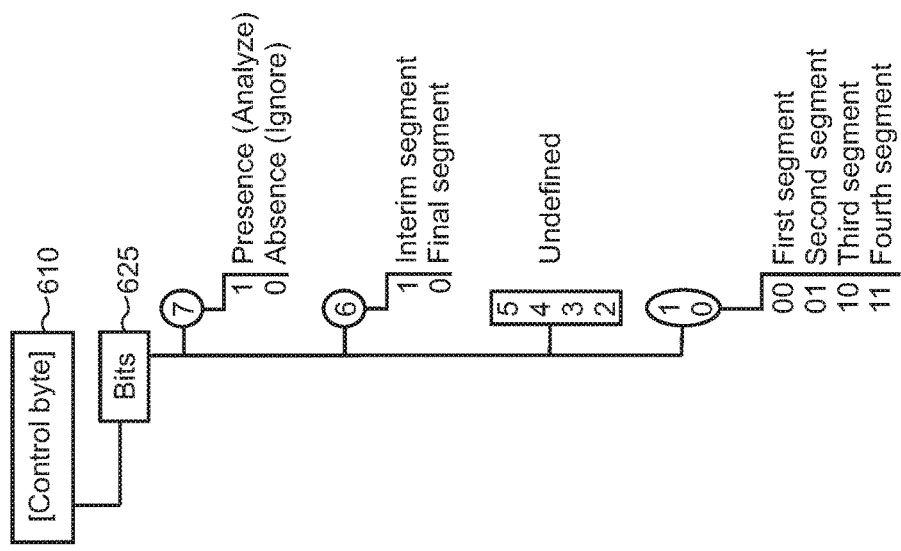

1400

1500

TRUSTED PLATFORM MODULE ATTESTATION FLOW OVER SIMPLE AUTHENTICATION AND SECURITY LAYER WITH MULTIPLE SYMMETRIC KEY IDENTIFICATION

BACKGROUND

Simple Authentication and Security Layer (SASL) is a framework defined under RFC-4422 (Request for Comments) from the Internet Engineering Task Force (IETF) that may be utilized to exchange information between a client computing device and server for client authentication, for example, with a cloud-based service provider. The SASL framework can be used with various messaging protocols including Hypertext Transfer Protocol (HTTP) and Advanced Message Queuing Protocol (AMQP). Internet of Things (IoT) devices are a type of client computing device that are configured with sensors and network connectivity to report telemetry data. IoT devices can also use the SASL framework for authentication.

SUMMARY

An existing SASL framework is modified to include a control byte that enables the transmission of a message over multiple segments to thereby overcome frame size limitations in typical SASL implementations. The segmented messaging exchange may be utilized between any computing devices that can utilize the SASL framework for authentication. In an illustrative example, the client computing device is an IoT device that reports telemetry data to a specific IoT solution that is supported on an IoT hub (e.g., a collection of servers and databases). IoT solutions can be implemented using software on the IoT hub that may interoperate with an IoT device to support specific functionality. Exemplary IoT solutions can include artificial intelligence and machine learning algorithms and processes, analytic tools, automated operations, and data storage, among other solutions. An attestation process is implemented between the IoT device and a provisioning service that authenticates the device and assigns it to an appropriate IoT solution on the IoT hub. A control byte in the modified SASL framework is utilized to define attributes about a given message and its contents. Both the IoT device and provisioning service can utilize and configure the control byte in the exchanged attestation messages.

In some implementations, a client computing device can be configured with a Trusted Platform Module (TPM) that provides a trusted execution environment in which various operations may be supported, including device attestation. The TPM may store cryptographic public and private keys which are used in the attestation process. SASL limits a size of the frames used during the authentication process to 512 bytes which may be too small to transmit public keys or encoded information within a single message. The client computing device and provisioning service can both use respective control bytes to indicate to the other that multiple segmented messages may be forthcoming, and that the segmented messages are to be combined to formulate a single message.

Bits in the control byte may be used, for example, to convey the presence or absence of information (e.g., the recipient should read the control byte or ignore the control byte), whether the current message is an interim segment or a final segment, and the sequence number of the segment (e.g., a first message segment, a second message segment, etc.). In an exemplary implementation, the client computing device may be an SASL-INIT message that indicates to the provisioning service that the client computing device is using the SASL-TPM mechanism (as opposed to other SASL mechanisms like SASL-PLAIN or SASL-EXTERNAL). The client computing device may have selected the SASL-TPM mechanism from a plurality of options advertised by the provisioning service to the client computing device.

The client computing device may transmit two public keys in separate message segments, including an endorsement key and a storage root key, that the provisioning service uses to encode a challenge key. The control byte included in a first message segment for the first public key (i.e., the endorsement key) may be configured to indicate that it is an interim message and therefore the provisioning service can expect to receive another message segment with the second public key. Upon receiving the endorsement key and storage root key, the provisioning service can encode the two keys into a challenge key. The provisioning service can break the challenge key into one or multiple segments depending on the overall size of the challenge key due to the 512-byte size constraint imposed by the SASL framework. The control byte in each challenge key message may indicate whether the segmented challenge keys are an interim message or a final message, and identify a segment sequence number (e.g., first, second, third, or fourth) in a current attestation message flow.

After receiving the full challenge key from the provisioning service, the client computing device decodes the challenge key to derive a Shared Access Security (SAS) token which is transmitted to the provisioning service as part of the authentication process. The client computing device may transmit a control byte with the SAS token that indicates it is the final message to be read by the provisioning service.

Modifying the existing SASL framework to support the control byte streamlines the attestation process and enhances security by leveraging the trusted execution environment provided by the TPM. For example, the multiple public keys (i.e., endorsement key and storage root key) can be separately transmitted to the provisioning service. The provisioning service can respond by transmitting a challenge key in segmented messages which are combined by the client computing device. By enabling computing devices to break up messages using the proven SASL framework, larger public keys and encoded challenges can be utilized to thereby improve attestation security.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIG. 6 shows an illustrative diagram of a series of attestation artifacts including a control byte which may be exchanged during an attestation process;

FIG. 7 shows an illustrative diagram of the bits within the control byte which define attributes for a transmitted message;

FIGS. 8-10 show illustrative configurations of the bits within the control byte and respectively defined attributes;

Like reference numerals indicate like elements in the drawings. Elements are not drawn to scale unless otherwise indicated.

DETAILED DESCRIPTION

Figure 1:
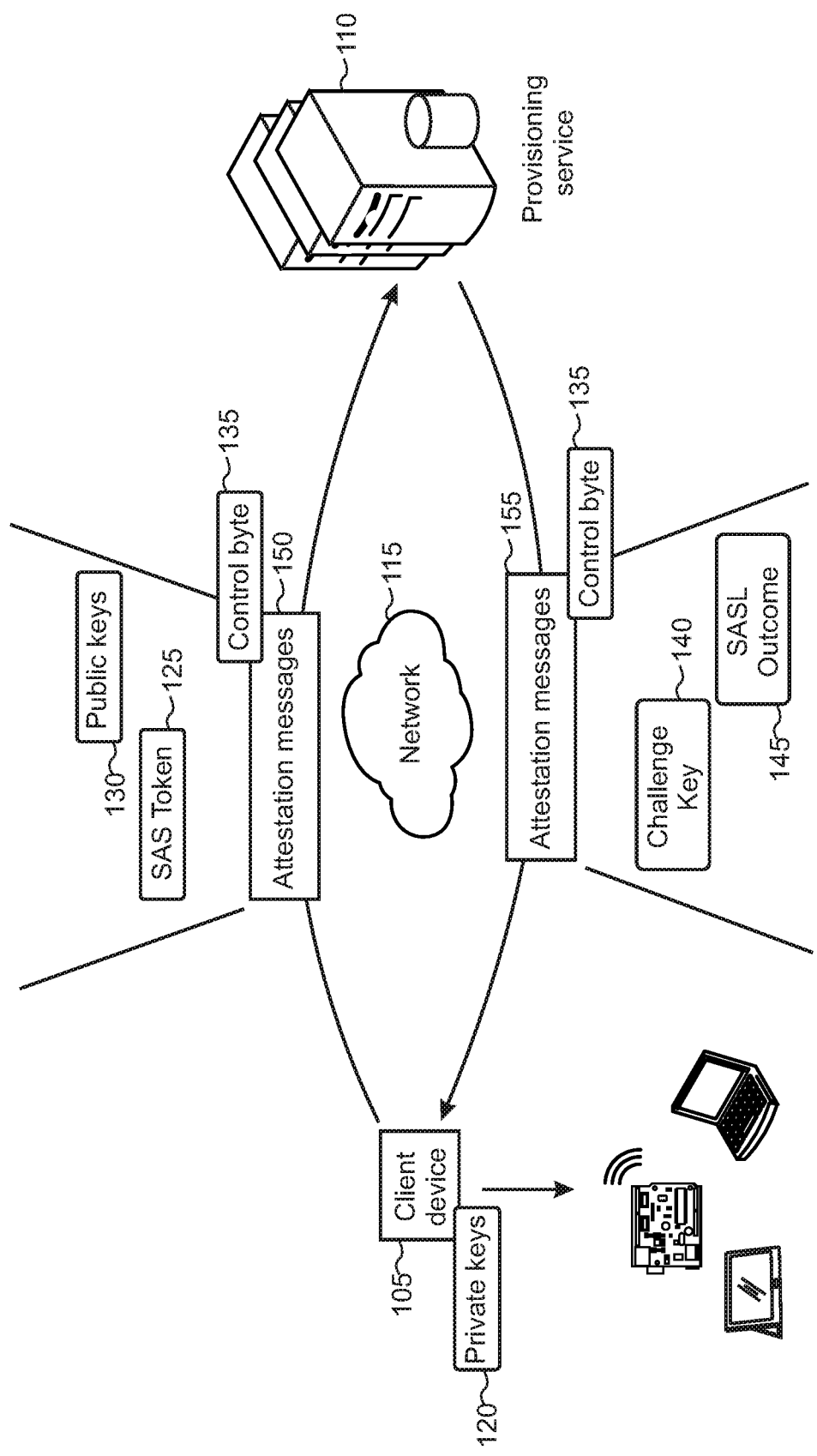
FIG. 1 shows an illustrative environment in which a client computing device can exchange attestation messages with a provisioning service.

FIG. 1 shows an illustrative environment in which a client computing device 105 and provisioning service 110 exchange messages during an attestation process so that the provisioning service can authenticate the client computing device to use services provided by a cloud service provider. The client computing device and provisioning service are configured with network connectivity to connect to a network device which provides access to a network 115, which may include one or more of local area networks, wide area networks, the Internet, and the world wide web to enable communication between the client computing device and provisioning service.

The provisioning service may include servers and databases that are configured to authenticate client computing devices such as an Internet of Things (IoT) device configured with sensors and network connectivity that can report data to an IoT solution (not shown). IoT solutions can be implemented, for example, using software on a remote server that is configured to interoperate and support specific IoT device functionality. Exemplary IoT solutions can include artificial intelligence and machine learning algorithms and processes, analytic tools, automated operations, and data storage, among other solutions. The provisioning service may associate the IoT device with a specific customer account and IoT solution. The attestation process depicted in FIG. 1 may be utilized to verify the IoT device's identity before assigning it to an IoT solution.

The client computing device may be any type of device which may utilize an attestation process to authenticate itself with another computing device, such as a remote server. For example, the client computing device may be a laptop computer, desktop computer, smartphone, or an IoT-enabled device configured with network connectivity. FIG. 1 shows an exemplary System on a Chip (SoC) configuration that can implement an IoT device or enable transition of a device, component, or object into an IoT-configured device. The discussion of the client computing device herein pertains to any type of computing device which is capable of performing an attestation process with a remote service.

Figure 2:
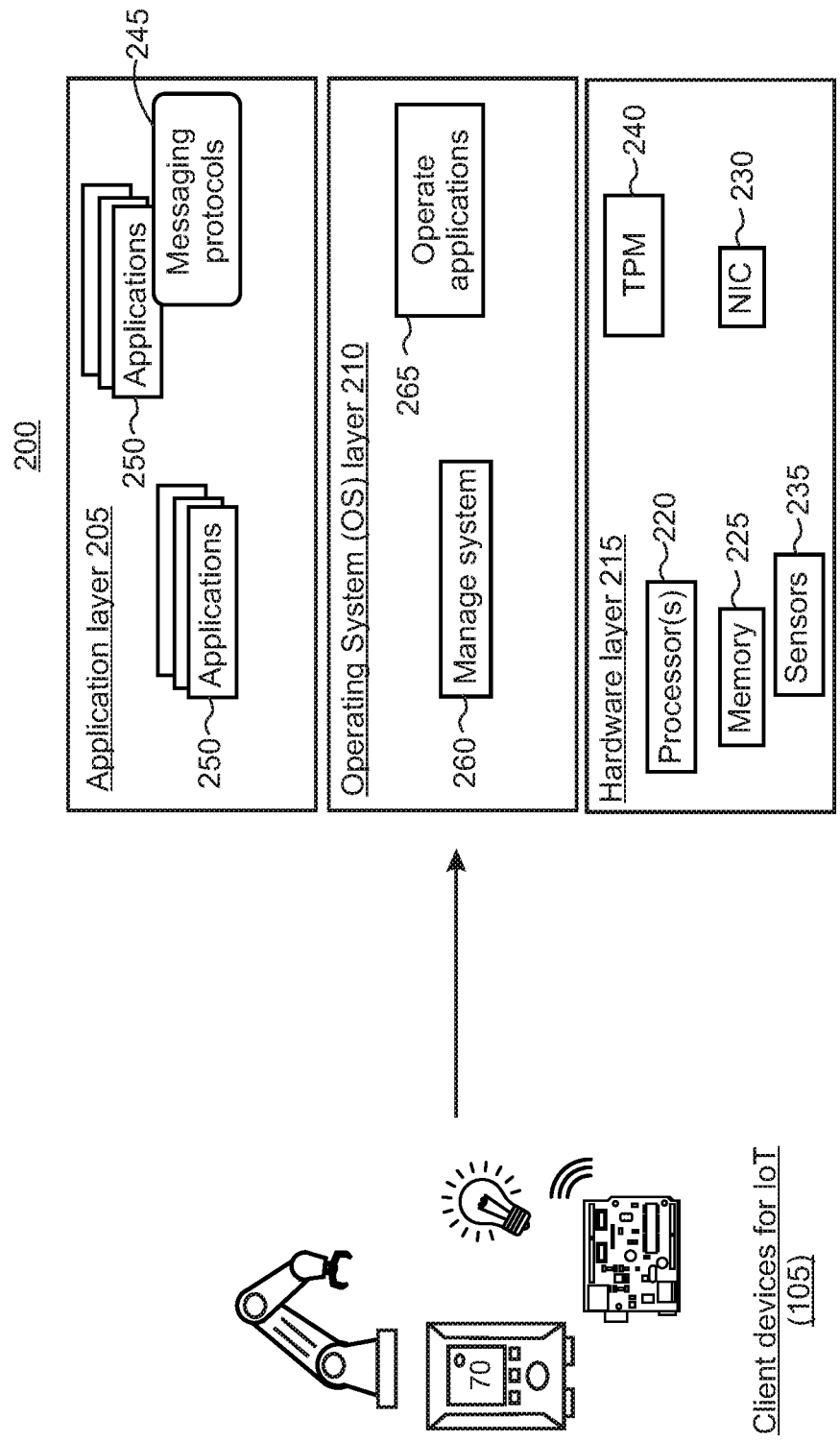
FIG. 2 shows an illustrative Internet of Things (IoT) device architecture which may be implemented in a client computing device.

FIG. 2 shows an illustrative architecture 200 of an IoT-enabled client computing device 105 that may interconnect and/or communicate over various networks, and typically utilize one or more sensors to gather pertinent data. IoT devices can utilize various sensors, actuators, software, network connectivity, and connections to remote servers that support IoT solutions to, for example, facilitate and establish comprehensive knowledge, understanding, or insight into a component or its environment. As illustratively shown in FIG. 2, exemplary IoT devices 105 can include commercial machinery like a crane, or household items such as a light bulb, thermostat, and the like. However, these devices are only illustrative as the number, variety, and/or type of objects or components which can be configured as an IoT device are not limited and can vary to meet the needs of a particular implementation.

The architecture is arranged in layers and includes a hardware layer 215, an operating system (OS) layer 210, and an application layer 205. The hardware layer 215 provides an abstraction of the various hardware used by the IoT device 105 to the layers above it. In this illustrative example, the hardware layer supports one or more processors 220, memory 225, various sensors 235 (e.g., temperature sensor, barometers, proximity sensors) for gathering data, a NIC (network interface controller) 230 including an interface for wireless or wired connections, and a trusted platform module (TPM) 240.

The TPM may be implemented using a specialized hardware chip that is configured to support hardware-based authentication for the IoT device 105. The TPM is utilized to increase device integrity and security by enabling verification that the IoT device performs as intended. The TPM utilizes public keys and private keys that are unique to the TPM and IoT device and are kept private and secure in the TPM. The provisioning service 110 can utilize public and private keys for device recognition during the attestation process. In other embodiments, the TPM may be implemented using firmware or a combination of hardware and firmware to provide the authentication functionalities for the IoT device. The client computing device attestation process is performed using the unique public and private keys that are stored in the TPM.

The application layer 205, in this illustrative example, supports various applications 250 which may include messaging protocols 245 for communicating over a network to other computing devices, such as a remote server. Any number of applications can be utilized by the IoT device 105, whether proprietary or third-party applications. The applications can be implemented using locally executing code. However, in some cases, applications can rely on services and/or remote code execution provided by remote servers or other computing platforms. The messaging protocols may operate at the application layer within, for example, the TCP/IP (Transmission Control Protocol/Internet Protocol) model or in the OSI (Open Systems Interconnection) model. The OS layer 210 supports, among other operations, managing the operating system 260 and applications 265. The OS layer may interoperate with the application and hardware layers to facilitate execution of programs and perform various functions and features.

Referring back to FIG. 1, during the attestation process the client computing device and provisioning service may transmit and receive a series of messages 150, 155 according to the Simple Authentication and Security Layer (SASL) framework. The SASL framework is a security layer protocol which may be utilized by a given messaging protocol (e.g., Advanced Message Queueing Protocol (AMQP), Hypertext Transfer Protocol (HTTP), etc.). Using the SASL framework over a series of exchanged messages, the client computing device may transmit an SAS token 125 and public keys 130. The client computing device may use a secure private key 120 to generate the SAS token. The provisioning service may transmit a challenge key 140 and SASL outcome 145 during the exchange. Both the client computing device and provisioning service may utilize the modified SASL framework to include a control byte 135 in a message to facilitate the attestation process and accommodate the size of a given message, as discussed in greater detail below.

Figure 3:
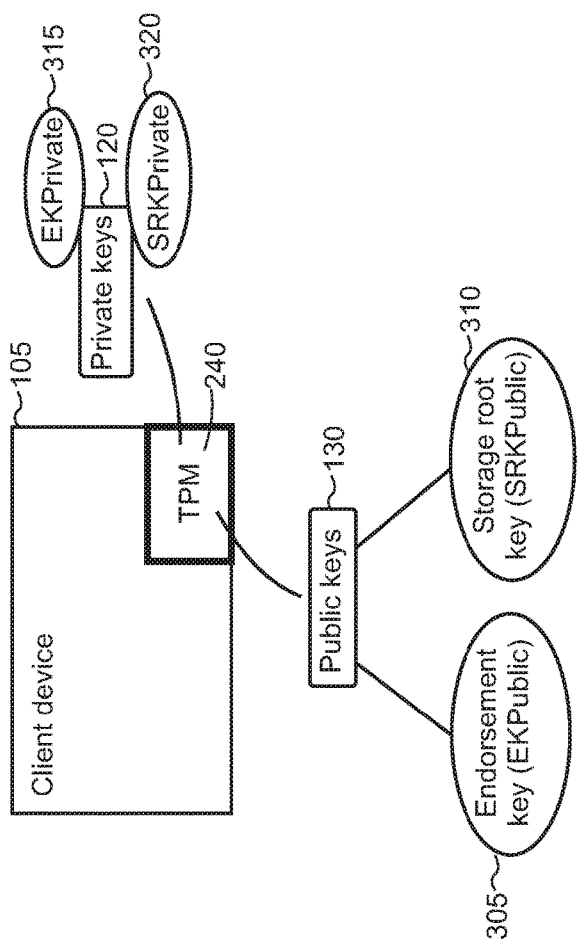
FIG. 3 shows an illustrative diagram of a client computing device that uses a trusted platform module (TPM) which stores public keys and private keys.

FIG. 3 shows an illustrative diagram of the client computing device 105 with which the TPM 240 operates in a trusted execution environment that is separate from the rest of the client computing device. The private keys 120 and public keys 130 are unique to the TPM of the client computing device and are utilized to identify that specific client computing device during, for example, an attestation process. The public keys can include an endorsement key (EKPublic) 305 and a storage root key (SRKPublic) 310, and the private keys can include the asymmetric private key portions of the respective public keys. For example, the private keys can include the endorsement key (EKPrivate 315) and the storage root key (SRKPrivate 320), which are utilized to decrypt a challenge key from the provisioning service. In some implementations, the endorsement key is embedded in the TPM security hardware at the point of manufacture. The storage root key 310 is unique to ownership of the client computing device. The storage root key may be created when a customer sets up the client computing device, and a new storage root key may be generated upon an indication of new ownership over the client computing device.

Figure 4:
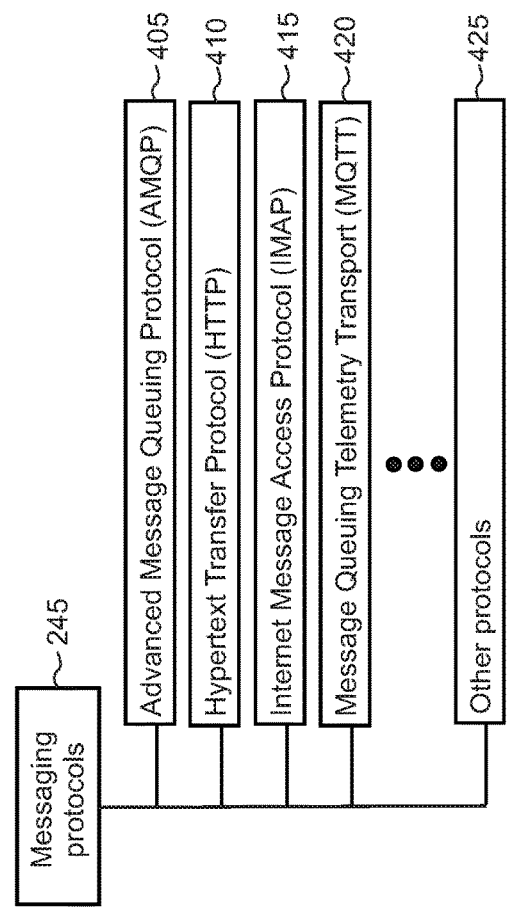
FIG. 4 shows an illustrative taxonomy of messaging protocols which may be used by the client computing device and provisioning service to exchange messages.

FIG. 4 shows a taxonomy of messaging protocols 245 which may be used between the client computing device and provisioning service to exchange messages. Exemplary and non-exhaustive messaging protocols include Advanced Message Queuing Protocol (AMQP) 405, Hypertext Transfer Protocol (HTTP) 410, Internet Message Access Protocol (IMAP) 415), Message Queuing Telemetry Transport (MQTT) 420, and other protocols 425 which may not be listed, such as Simple Mail Transfer Protocol (SMTP).

Figure 5A:
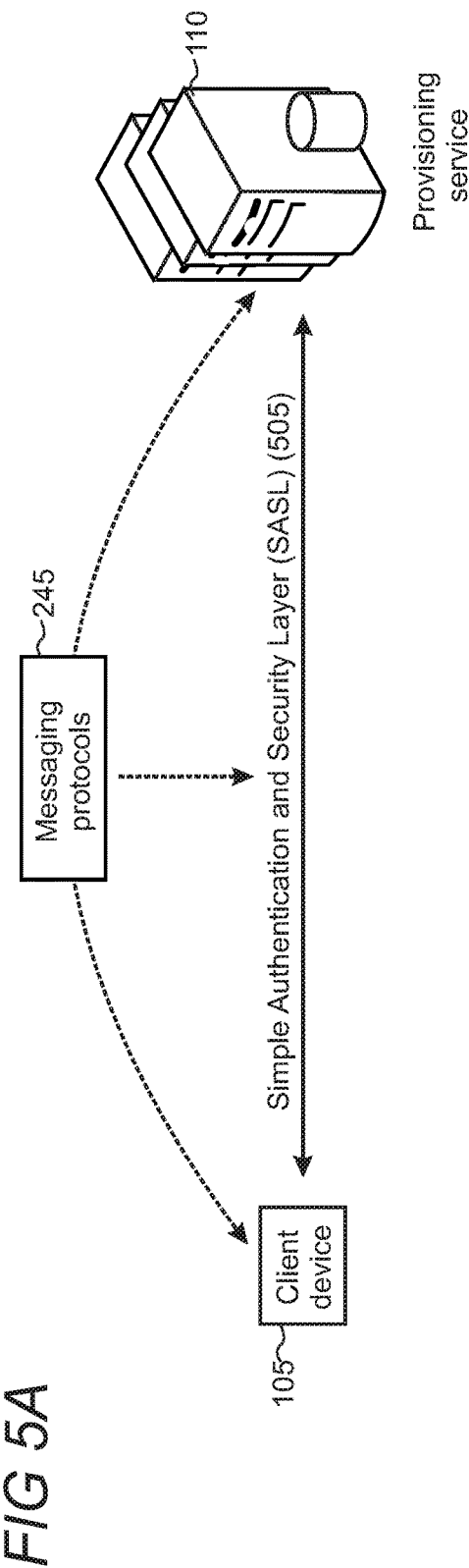
FIG. 5A shows an illustrative Simple Authentication and Security Layer (SASL) framework which is utilized with messaging protocols during an attestation process.
Figure 5C:
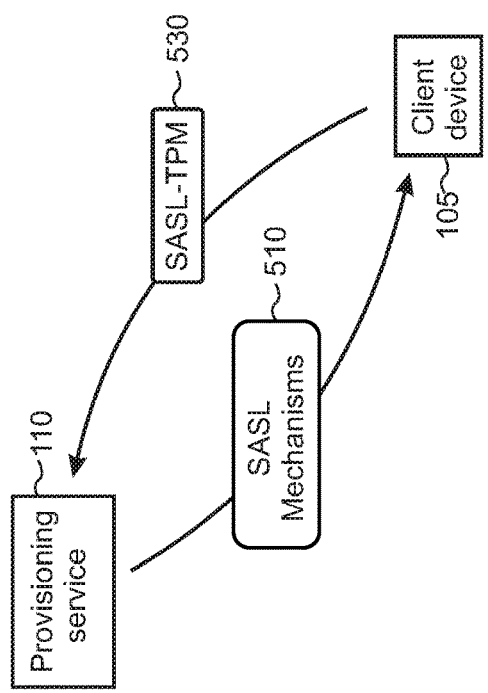
FIG. 5C shows an illustrative diagram in which the client computing device selects the SASL-TPM mechanism from the advertised SASL mechanisms.
Figure 5B:
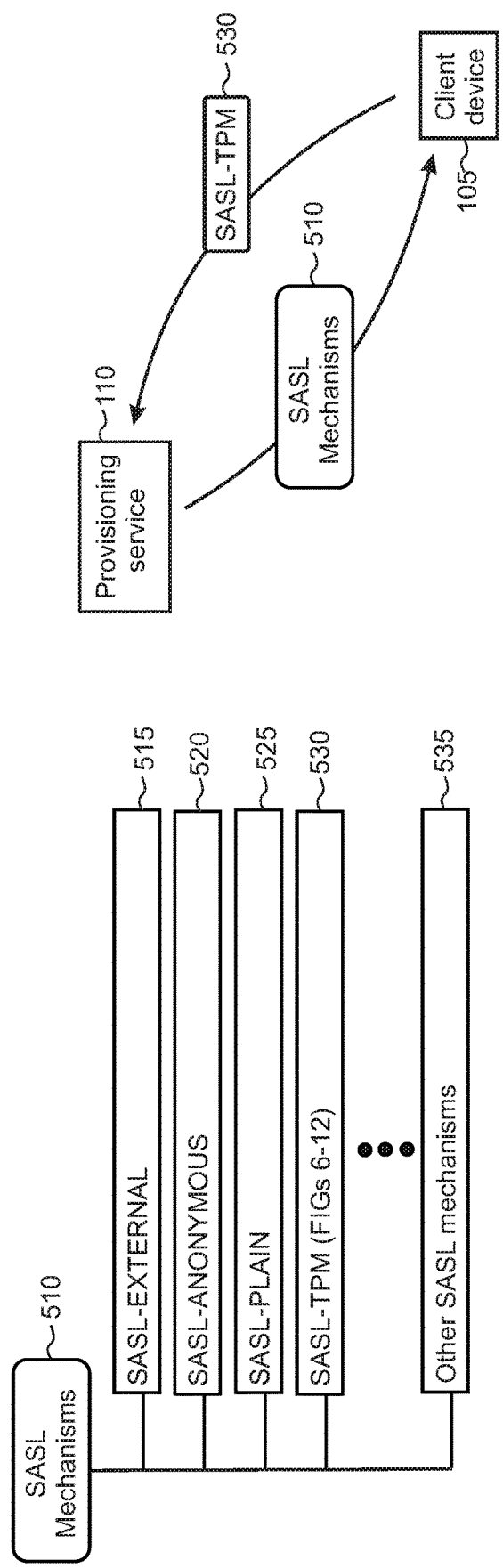
FIG. 5B shows an illustrative taxonomy of SASL mechanisms which may be utilized by the client computing device and provisioning service.

FIG. 5A shows an illustrative environment in which the messaging protocols 245 may utilize the SASL framework 505 for authentication and device attestation. FIG. 5B shows an illustrative and non-exhaustive taxonomy of available SASL mechanisms 510 which may be utilized by the provisioning service 110 and the client computing device 105. The various mechanisms may be configured with a series of challenges and responses but with different configurations. Exemplary SASL mechanisms include SASL-EXTERNAL 515, SASL-ANONYMOUS 520, SASL-PLAIN 525, SASL-TPM (as explained in the present disclosure) 530, and other SASL mechanisms 535.

The various SASL mechanisms may be advertised to the client computing device upon the client computing device initiating the attestation process with the provisioning service. FIG. 5C shows an illustrative diagram in which the SASL mechanisms 510 are advertised to the client computing device for selection and the client computing device selects SASL-TPM 530. An SASL-INIT message that the client computing device transmits to the provisioning service can contain the mechanism chosen (e.g., SASL-TPM).

FIG. 6 shows an illustrative diagram of attestation artifacts 605 which are transmitted by the client computing device or the provisioning service using the SASL-TPM mechanism 530, as discussed below with respect to FIGS. 11 and 12. The control byte may be included with a message to define attributes about the message content. Individual bits or groups of bits 625 within the control byte define certain attributes about the message content.

FIG. 7 shows an illustrative diagram of the attributes that one or more bits 625 can represent based on their number. A computing device that receives the control byte can examine the individual or collective bits for information. The present description and depiction in FIG. 7 characterize the byte starting at zero for the first bit and ending at seven for the eighth bit. Other characterizations can show the first bit starting at one and the eighth bit ending at eight.

The seventh bit, or most significant bit (MSB), can represent the presence or absence of valid information being contained within the control byte. For example, when the bit is set to one, then that can indicate that the control byte is configured with useful information about the contents, and therefore a receiving device can analyze the remainder of the bits. When the bit is set to zero, then that can indicate that the control byte has not been configured with valid or useful information, and therefore the reading party can ignore the contents of the remainder of the bits in the control byte.

The sixth bit can indicate whether additional messages will be forthcoming in the sequence or if a current message is the last message that a receiving device can expect. When the sixth bit is set to one, then that indicates to a receiving device that it is an interim message. An interim message indicates that it is not yet the final message in the sequence, and therefore the receiving party can wait for and expect one or more additional messages. When the sixth bit is set to zero, then that indicates to the receiving device that the current message is a final message in the sequence and no additional messages will be forthcoming. The receiving device can combine the segmented (e.g., interim and final) messages into a single message for use upon receiving the final segment.

In some implementations, bits 2-5 may be undefined and repurposed later. Bits one and zero may be used together to indicate the sequence number of a message. As shown in FIG. 7, the bits can be utilized together to indicate if a segmented message is the first, second, third, or fourth segment in the series. This information may help a receiving party combine the messages in proper sequential order.

While FIG. 7 assigns specific bits and numbers in each bit to a specific meaning, other configurations are also possible for the given implementation. For example, bits 2-5 may be used to define the sequence number of a message instead of being undefined. Furthermore, the sixth bit may be reconfigured to use the number zero to indicate an interim message and the number one to indicate a final message.

FIGS. 8-10 show illustrative scenarios in which the control byte 610 is set to specific numbers to define attributes about a message. In each figure the seventh bit is on the left-hand side and the zeroth bit is on the right-hand side. Certain bits are emphasized in the figures for clarity in exposition. In FIG. 8, the emphasized bits indicate that the control byte contains valid information (seventh bit set to one), is an interim message (sixth bit set to one), and is the first segment in the sequence (zeroth bit set to one). In FIG. 9, the control byte indicates that there is presence (seventh bit set to one), the message is final in the segment (sixth bit set to zero), and the message is the third in the segment (zeroth and first bits set to one). In FIG. 10, the seventh bit is set to zero which indicates the absence of valid information, that is, the bits in the control byte provide no useful information to convey to the receiving device. In some implementations, the seventh bit may be set to zero when a transmitting device acknowledges the receipt of information from another device.

Referring back to FIG. 6, the attestation artifacts additionally include an ID Scope 615, Registration ID 620, EKPublic 305, SRKPublic 310, challenge key 140, and SAS token 125. The private keys 120 are not shown as they stay secured within the TPM to decode the challenge key and are not transmitted. The Registration ID is used to uniquely identify the client computing device in the provisioning service. The ID Scope is used to uniquely identify a specific provisioning service to which the client computing device associates. The ID Scope may be immutable to assure its uniqueness. The ID Scope and Registration ID may both be comprised of alpha-numeric characters.

The EKPublic and SRKPublic represent the public endorsement and storage root keys as discussed with respect to FIG. 3. The challenge key 140 may be the encoded challenge key produced by the provisioning service based on the public keys from a client computing device. The challenge key is received by the client computing device and decoded using the private keys stored in the TPM. The SAS (Shared Access Security) token 125 is generated by the TPM of the client computing device after decoding the challenge key and is used by the provisioning service to confirm the identity of the TPM and the client computing device.

An existing SASL framework is modified to accommodate messages with an increased byte size while leveraging the enhanced security provided by the TPM. In typical implementations, the SASL framework may support messages with a maximum of 512 bytes. TPMs can utilize an endorsement key and storage root key (FIG. 3) which are both utilized during the attestation process. Other attestation artifacts, such as the ID Scope and Registration ID, can collectively result in a message size greater than 512 bytes.

The implementation of a control byte 610 with a message is utilized by the client computing device and provisioning service to continue utilizing the SASL framework while accommodating the increased byte size of messages. For example, a message that may contain over 512 bytes can be segmented into multiple messages for transmission. Each segmented message can include a control byte that describes attributes about the respective message to the receiving device. For example, the control byte can indicate that the segmented message is an interim message and that the message is the first segment in the sequence of forthcoming messages.

The control byte can likewise be used when an entire message is under 512 bytes. For example, the bits within the control byte can indicate that the message is the final segment, so the receiving device knows not to wait for additional messages. Thus, the control byte is configured to accommodate various scenarios of the SASL framework.

Figure 11:
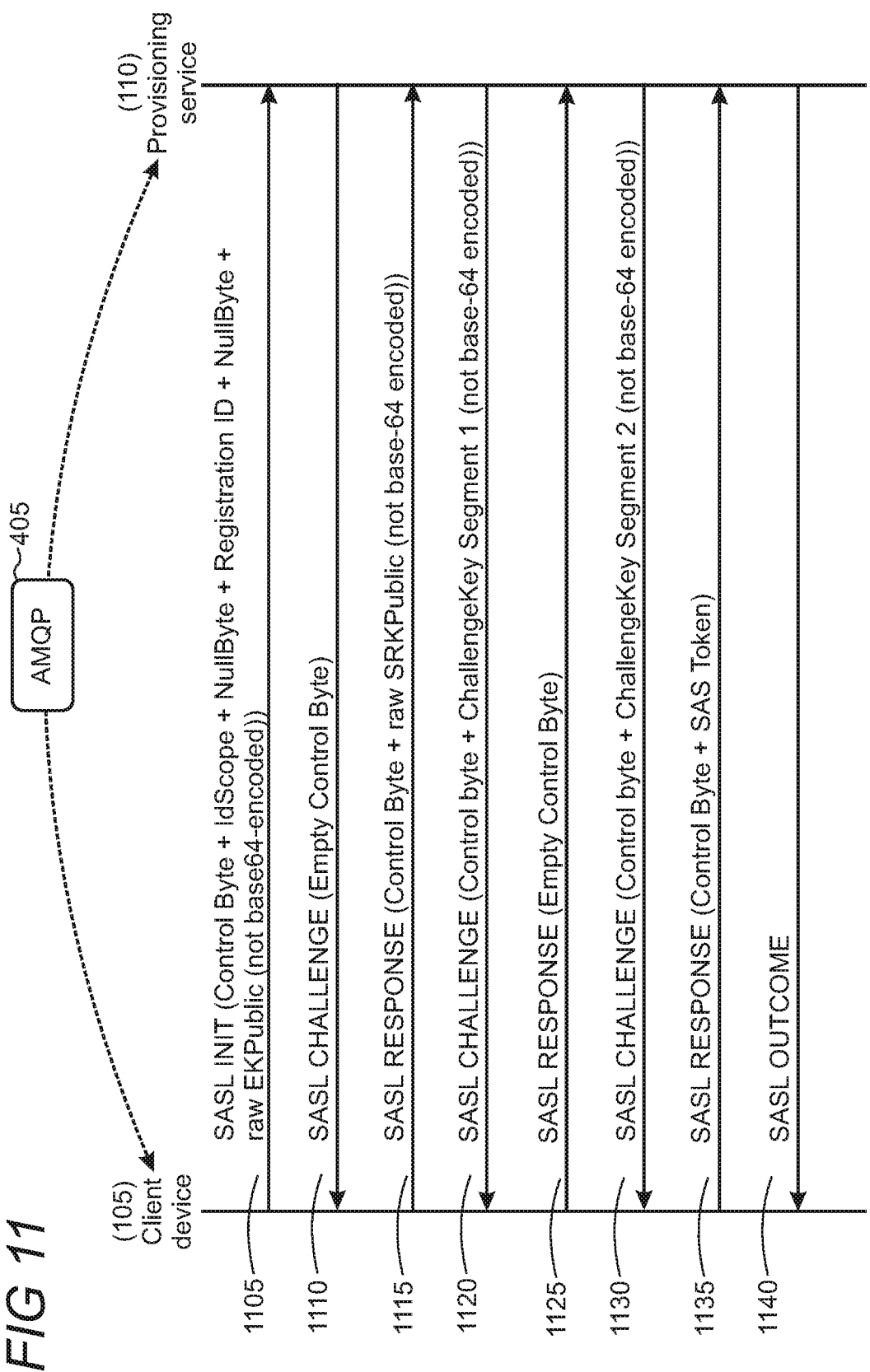
FIGS. 11-12 show illustrative workflows of the attestation process using the SASL frameworks over the Advanced Message Queuing Protocol (AMQP)

FIG. 11 shows an illustrative diagram in which an attestation process occurs between the client computing device 105 and the provisioning service 110 over AMQP 405 messaging protocol using a modified SASL framework. In the SASL INIT message 1105 the client computing device transmits a series of artifacts to initiate the attestation process, including the EKPublic. The control byte may indicate to the provisioning service, upon examination of the bits within the control byte, that the SASL INIT message is an interim message and that it is the first message in the segment (first bit set to zero and zeroth bit set to one).

The SASL challenge 1110 may have an empty control byte (i.e., the seventh bit is set to zero) to indicate the absence of valid information. The SASL challenge may be an acknowledgement to the client computing device that the provisioning service received the previous message. The SASL response 1115 includes a control byte with the SRKPublic. The control byte may indicate that the message is the final message in the segment (sixth bit set to zero) and the second message in the segment (first bit set to one and zeroth bit set to zero).

After receiving the two public keys from the client computing device, the provisioning service encodes the public keys in a challenge key to be decoded by the client computing device using the private keys in the TPM. The size of the challenge key may be greater than 512 bytes and therefore transmitted over two message segments. In other implementations, the challenge key may be transmitted over one, three, or four message segments depending on the full message size. The SASL challenge 1120 includes a first segment of the challenge key and may be transmitted with a control byte that indicates the challenge key is an interim segment and a first message segment. The SASL response 1125 may contain the empty control byte to acknowledge the receipt of the first message segment of the challenge key. The SASL challenge 1130 may include the second message segment of the challenge key with a control byte that indicates the message is the final segment and it is the second message segment in the sequence of messages.

The client computing device generates the SAS (Shared Access Security) token after receiving the entire challenge key from the provisioning service. Using the received control byte, the client computing device recognizes that the second segment of the challenge key is the final segment. The client computing device combines the segmented challenge keys and then decrypts the challenge key using its private keys (i.e., EKPrivate and SRKPrivate). The SASL response 1135 includes the SAS token and the control byte may indicate that the message is the final message segment. The provisioning service transmits an SASL outcome 1140 which can authenticate or reject the client computing device depending on the authenticity of the SAS token. The provisioning service transmits the SASL outcome upon receiving the SAS token and recognizing, using the control byte, that it is the final message in the sequence.

Figure 12:
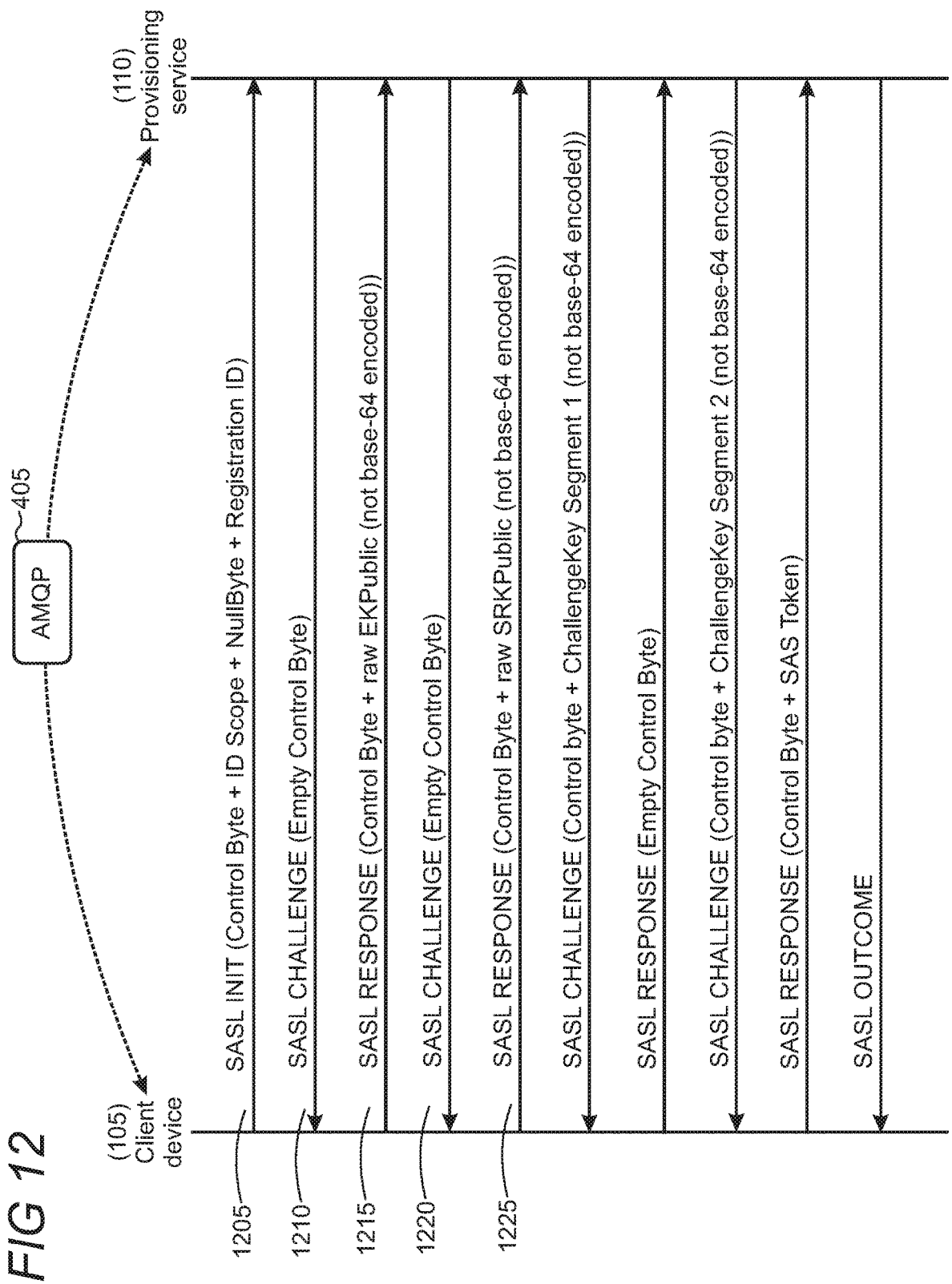

FIG. 12 shows a different attestation workflow from that shown in FIG. 11. The SASL INIT 1205 message includes the registration ID and ID Scope and fails to include the EKPublic. This may occur, for example, if packaging the EKPublic within the SASL INIT message exceeds the 512-byte limit imposed by the SASL framework. The control byte in the SASL INIT message may indicate the message is an interim message and is the first segment in the sequence of messages.

The SASL challenges 1210 and 1220 may both have empty control bytes which indicate the absence of valid information in the control byte. The SASL challenges 1210 and 1220 may be transmitted by the provisioning service to acknowledge receipt of previous messages transmitted by the client computing device.

The SASL responses 1215 and 1225 respectively include the EKPublic and SRKPublic, which may have been segmented due to size constraints. The control byte in the SASL response 1215 may indicate that the message is an interim message and the second segment in the sequence of messages. The control byte in the SASL response 1225 may indicate that the message is the final message and the third segment in the sequence of messages. Descriptions for the remainder of the messages may comport with that described in FIG. 11.

The EKPublic, SRKPublic, and SAS token can each be sent in distinct message segments if necessary due to size constraints imposed by the SASL framework. The client device sequentially transmits the EKPublic and then the SRKPublic to comport with the SASL-TPM mechanism. While FIGS. 11 and 12 show the challenge key divided in two message segments, the challenge keys can be divided in up to four message segments and each message segment can be identified using the zeroth and first bits in the control byte.

Figure 13:
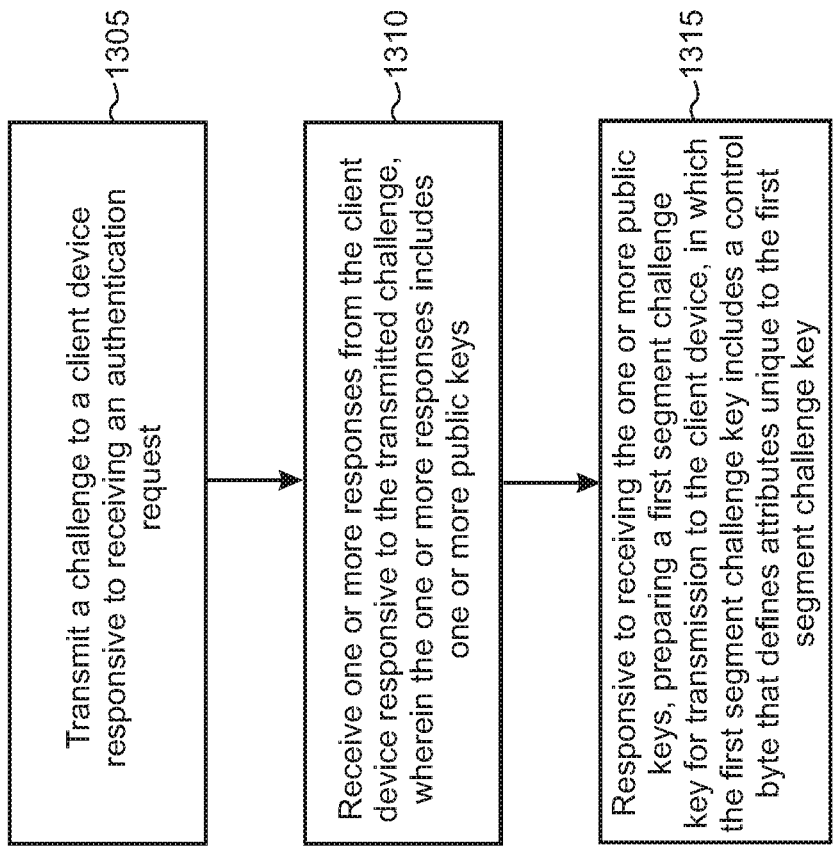
FIGS. 13-15 show illustrative processes performed by one or both of the client computing device or the provisioning service.
Figure 14:
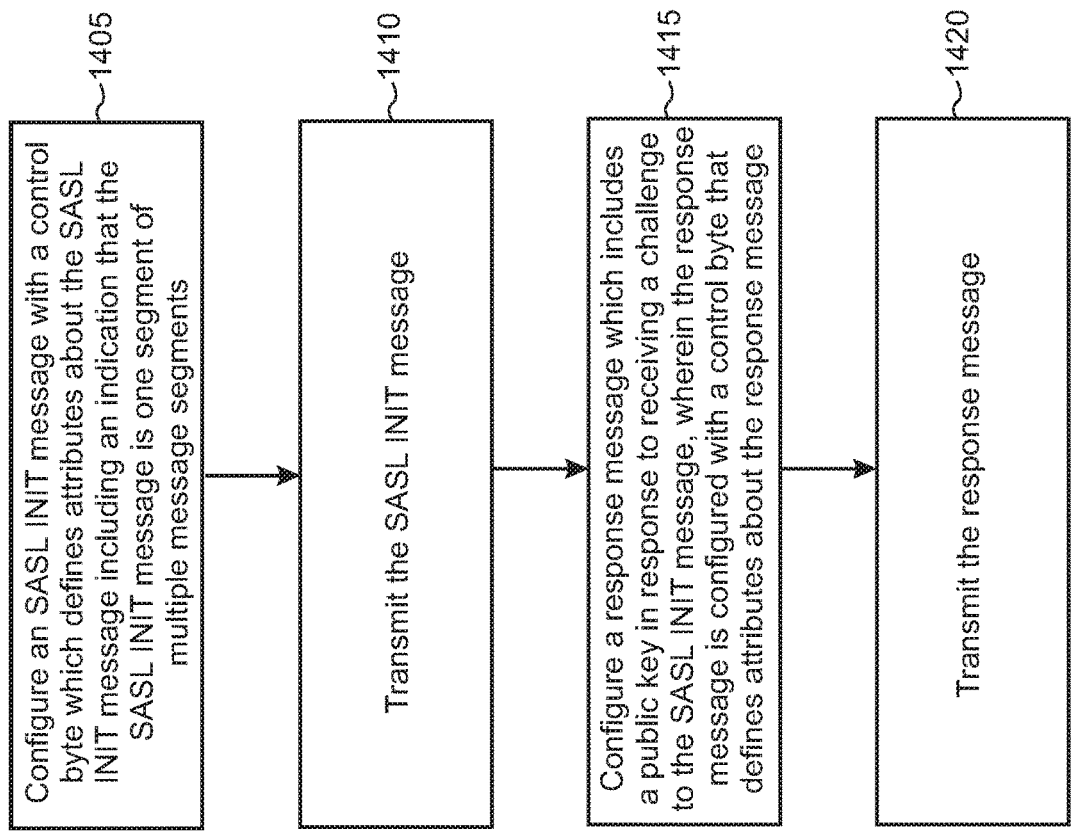
Figure 15:
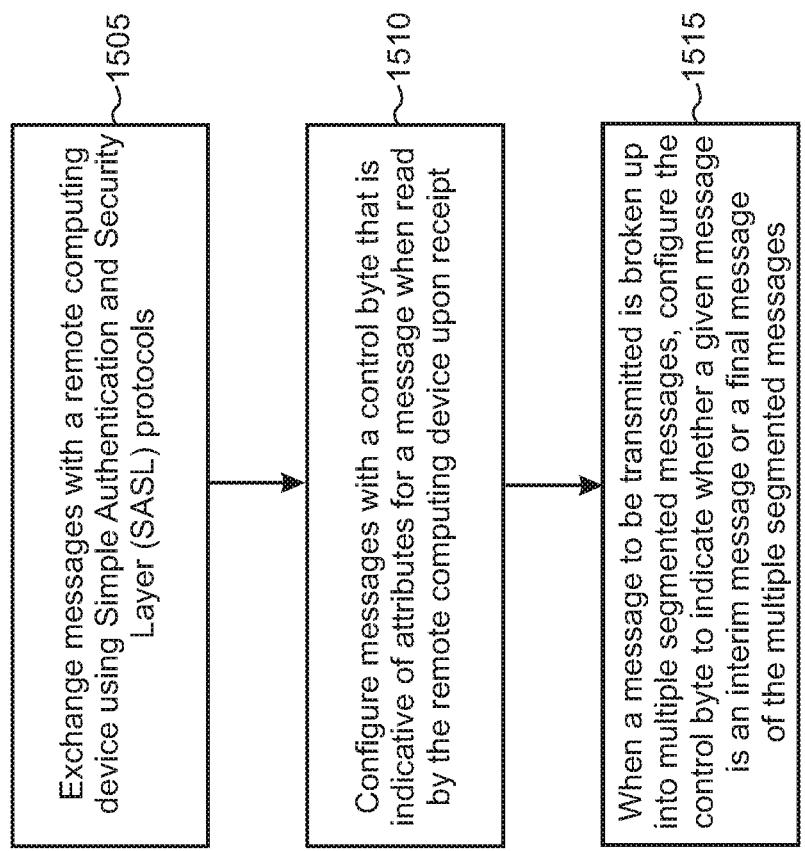

FIGS. 13-15 show flowcharts of illustrative methods which may be implemented by one or both of a client computing device or provisioning service. Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

FIG. 13 is a flowchart of an illustrative method 1300 which is performed by a provisioning service that may be comprised of one or more servers. In step 1305, the provisioning service transmits a challenge to a client computing device responsive to receiving an authentication request from the client computing device. In step 1310, the provisioning service receives one or more responses from the client computing device responsive to the transmitted challenge. The one or more responses include one or more public keys that are associated with the client computing device. In step 1315, the provisioning services prepares a first segment challenge key for transmission to the client computing device responsive to receiving the one or more public keys. The first segment challenge key includes a control byte that defines attributes unique to the first segment challenge key.

FIG. 14 is a flowchart of an illustrative method 1400 which is performed by a client computing device, such as an IoT device. In step 1405, the client computing device configures an SASL (Simple Authentication and Security Layer) INIT message with a control byte which defines attributes about the SASL INIT message. For example, the control byte may provide an indication that the SASL INIT message is one segment of multiple message segments. In step 1410, the client computing device transmits the SASL INIT message. In step 1415, the client computing device configures a response message which includes a public key in response to receiving a challenge to the SASL INIT message. The response message is configured with a control byte that defines attributes about the response message. In step 1420, the client computing device transmits the response message.

FIG. 15 is a flowchart of an illustrative method 1500 which is performed by a computing device. In step 1505, the computing device exchanges messages with a remote computing device using an SASL framework. In step 1510, the computing device configures messages with a control byte that is indicative of attributes for a message when read by the remote computing device upon receipt. In step 1515, when a message to be transmitted is broken up into multiple segmented messages, the computing device configures the control byte to indicate whether a given message is an interim message or a final message of the multiple segmented messages. This can provide an indication to the receiving device whether or not it has received the full message string or if there may be an additional message coming.

Figure 16:
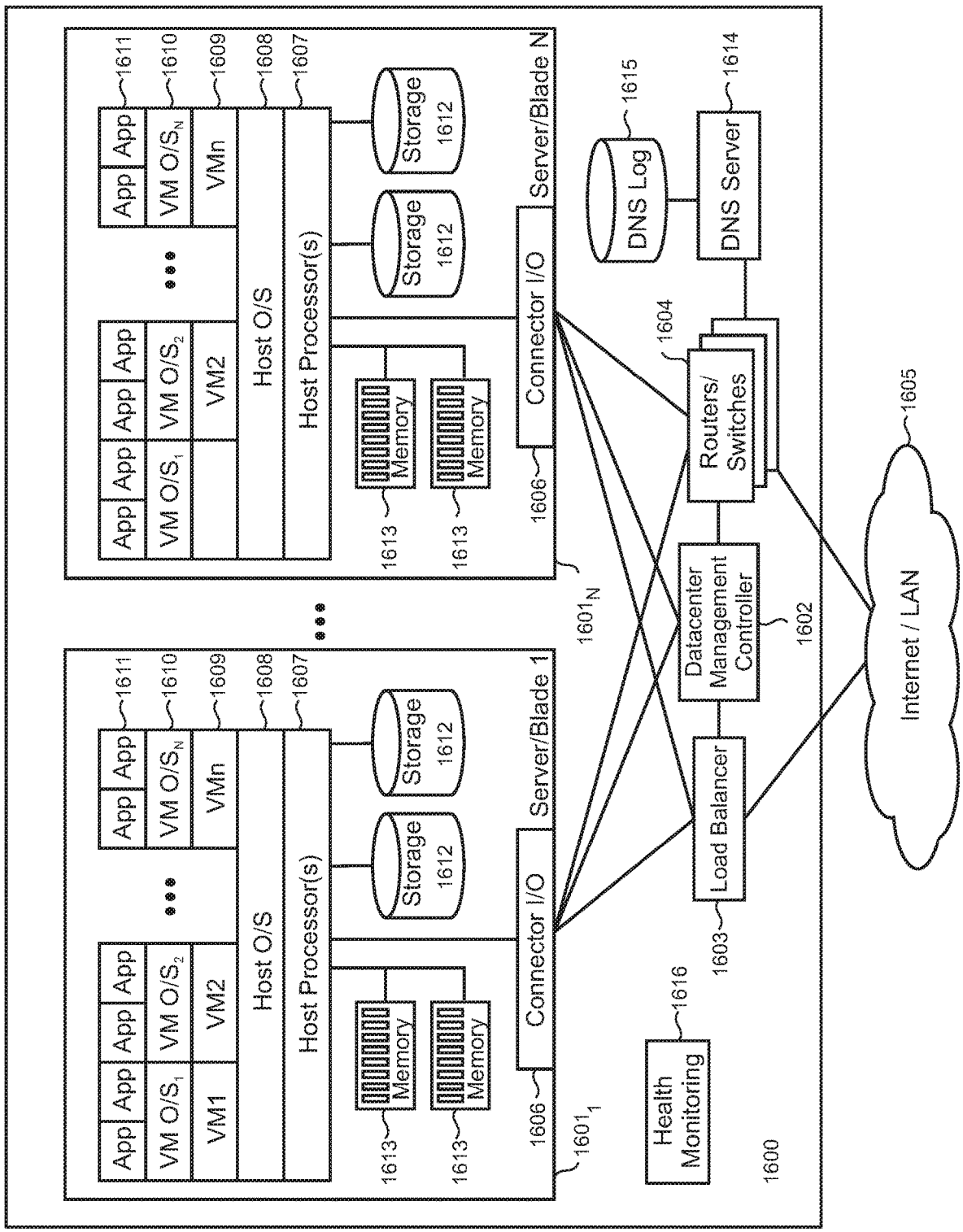
FIG. 16 is a block diagram of an illustrative datacenter that may be used at least in part to implement the present TPM attestation flow over Simple Authentication and Security Layer with multiple symmetric key identification.

FIG. 16 is a high-level block diagram of an illustrative datacenter 1600 that provides cloud computing services or distributed computing services that may be used to implement the present TPM attestation flow over Simple Authentication and Security Layer with multiple symmetric key identification. A plurality of servers 1601 are managed by datacenter management controller 1602. Load balancer 1603 distributes requests and computing workloads over servers 1601 to avoid a situation wherein a single server may become overwhelmed. Load balancer 1603 maximizes available capacity and performance of the resources in datacenter 1600. Routers/switches 1604 support data traffic between servers 1601 and between datacenter 1600 and external resources and users (not shown) via an external network 1605, which may be, for example, a local area network (LAN) or the Internet.

Servers 1601 may be standalone computing devices, and/or they may be configured as individual blades in a rack of one or more server devices. Servers 1601 have an input/output (I/O) connector 1606 that manages communication with other database entities. One or more host processors 1607 on each server 1601 run a host operating system (O/S) 1608 that supports multiple virtual machines (VM) 1609. Each VM 1609 may run its own O/S so that each VM O/S 1610 on a server is different, or the same, or a mix of both. The VM O/Ss 1610 may be, for example, different versions of the same O/S (e.g., different VMs running different current and legacy versions of the Windows® operating system). In addition, or alternatively, the VM O/Ss 1610 may be provided by different manufacturers (e.g., some VMs running the Windows® operating system, while other VMs are running the Linux® operating system). Each VM 1609 may also run one or more applications (Apps) 1611. Each server 1601 also includes storage 1612 (e.g., hard disk drives (HDD)) and memory 1613 (e.g., RAM) that can be accessed and used by the host processors 1607 and VMs 1609 for storing software code, data, etc.

Datacenter 1600 provides pooled resources on which customers can dynamically provision and scale applications as needed without having to add servers or additional networking. This allows customers to obtain the computing resources they need without having to procure, provision, and manage infrastructure on a per-application, ad-hoc basis. A cloud computing datacenter 1600 allows customers to scale up or scale down resources dynamically to meet the current needs of their business. Additionally, a datacenter operator can provide usage-based services to customers so that they pay for only the resources they use, when they need to use them. For example, a customer may initially use one VM 1609 on server 1601₁ to run their applications 1611. When demand for an application 1611 increases, the datacenter 1600 may activate additional VMs 1609 on the same server 1601₁ and/or on a new server 1601ₙ as needed. These additional VMs 1609 can be deactivated if demand for the application later drops.

Datacenter 1600 may offer guaranteed availability, disaster recovery, and back-up services. For example, the datacenter may designate one VM 1609 on server 1601₁ as the primary location for the customer's application and may activate a second VM 1609 on the same or different server as a standby or back-up in case the first VM or server 1601₁ fails. Datacenter management controller 1602 automatically shifts incoming user requests from the primary VM to the back-up VM without requiring customer intervention. Although datacenter 1600 is illustrated as a single location, it will be understood that servers 1601 may be distributed to multiple locations across the globe to provide additional redundancy and disaster recovery capabilities. Additionally, datacenter 1600 may be an on-premises, private system that provides services to a single enterprise user or may be a publicly accessible, distributed system that provides services to multiple, unrelated customers or may be a combination of both.

Domain Name System (DNS) server 1614 resolves domain and host names into IP (Internet Protocol) addresses for all roles, applications, and services in datacenter 1600. DNS log 1615 maintains a record of which domain names have been resolved by role. It will be understood that DNS is used herein as an example and that other name resolution services and domain name logging services may be used to identify dependencies.

Datacenter health monitoring 1616 monitors the health of the physical systems, software, and environment in datacenter 1600. Health monitoring 1616 provides feedback to datacenter managers when problems are detected with servers, blades, processors, or applications in datacenter 1600 or when network bandwidth or communications issues arise.

Figure 17:
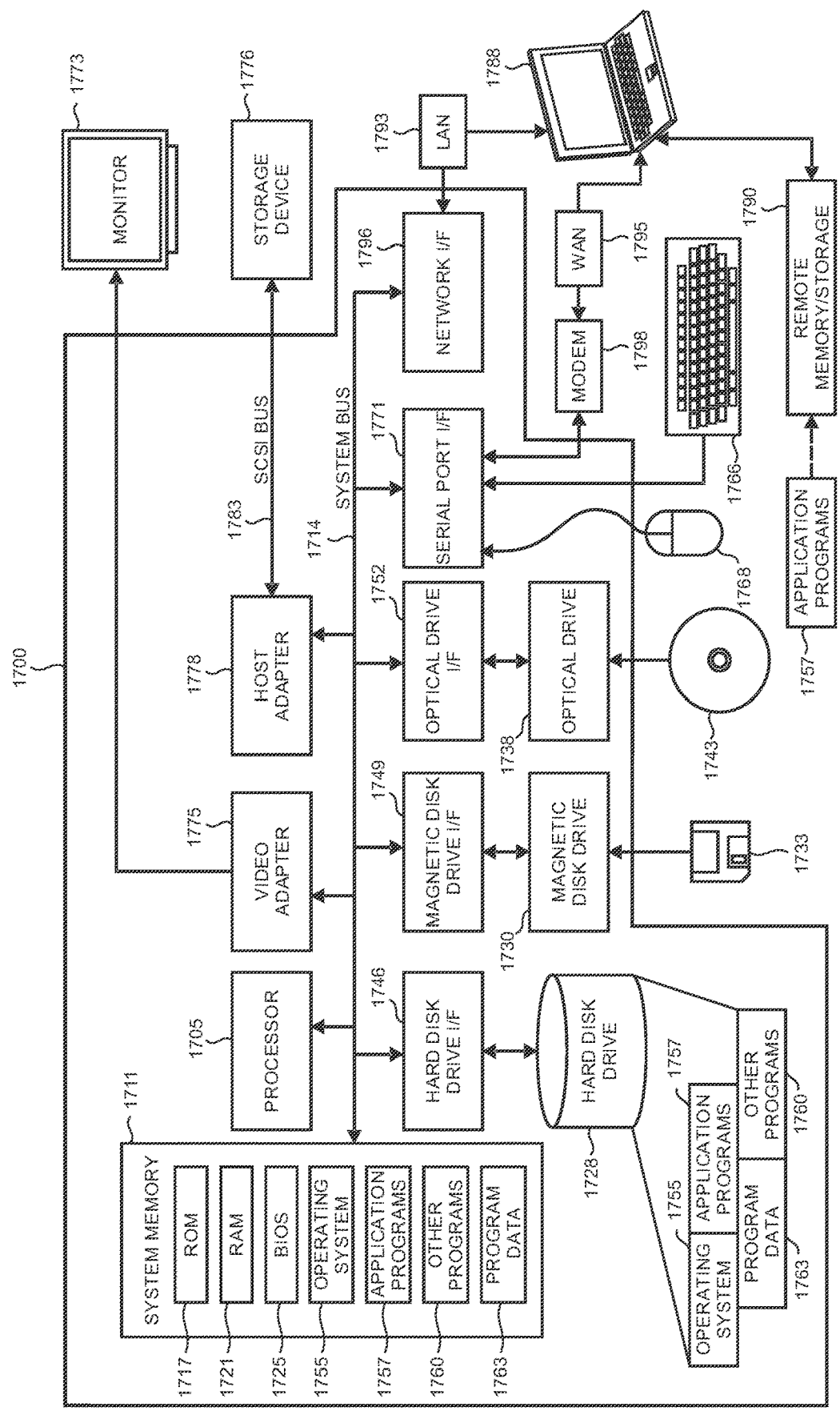
FIG. 17 is a simplified block diagram of an illustrative computing system or server that may be used in part to implement the present TPM attestation flow over Simple Authentication and Security Layer with multiple symmetric key identification.

FIG. 17 is a simplified block diagram of an illustrative computer system 1700 such as a PC, client machine, or server with which the present TPM attestation flow over Simple Authentication and Security Layer with multiple symmetric key identification may be implemented. Computer system 1700 includes a processor 1705, a system memory 1711, and a system bus 1714 that couples various system components including the system memory 1711 to the processor 1705. The system bus 1714 may be any of several types of bus structures including a memory bus or memory controller, a peripheral bus, or a local bus using any of a variety of bus architectures. The system memory 1711 includes read only memory (ROM) 1717 and random access memory (RAM) 1721. A basic input/output system (BIOS) 1725, containing the basic routines that help to transfer information between elements within the computer system 1700, such as during startup, is stored in ROM 1717. The computer system 1700 may further include a hard disk drive 1728 for reading from and writing to an internally disposed hard disk (not shown), a magnetic disk drive 1730 for reading from or writing to a removable magnetic disk 1733 (e.g., a floppy disk), and an optical disk drive 1738 for reading from or writing to a removable optical disk 1743 such as a CD (compact disc), DVD (digital versatile disc), or other optical media. The hard disk drive 1728, magnetic disk drive 1730, and optical disk drive 1738 are connected to the system bus 1714 by a hard disk drive interface 1746, a magnetic disk drive interface 1749, and an optical drive interface 1752, respectively. The drives and their associated computer-readable storage media provide non-volatile storage of computer-readable instructions, data structures, program modules, and other data for the computer system 1700. Although this illustrative example includes a hard disk, a removable magnetic disk 1733, and a removable optical disk 1743, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present TPM attestation flow over Simple Authentication and Security Layer with multiple symmetric key identification. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and do not include waves, signals, and/or other transitory and/or intangible communication media.

A number of program modules may be stored on the hard disk, magnetic disk 1733, optical disk 1743, ROM 1717, or RAM 1721, including an operating system 1755, one or more application programs 1757, other program modules 1760, and program data 1763. A user may enter commands and information into the computer system 1700 through input devices such as a keyboard 1766 and pointing device 1768 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1705 through a serial port interface 1771 that is coupled to the system bus 1714, but may be connected by other interfaces, such as a parallel port, game port, or universal serial bus (USB). A monitor 1773 or other type of display device is also connected to the system bus 1714 via an interface, such as a video adapter 1775. In addition to the monitor 1773, personal computers typically include other peripheral output devices (not shown), such as speakers and printers. The illustrative example shown in FIG. 17 also includes a host adapter 1778, a Small Computer System Interface (SCSI) bus 1783, and an external storage device 1776 connected to the SCSI bus 1783.

The computer system 1700 is operable in a networked environment using logical connections to one or more remote computers, such as a remote computer 1788. The remote computer 1788 may be selected as another personal computer, a server, a router, a network PC, a peer device, or other common network node, and typically includes many or all of the elements described above relative to the computer system 1700, although only a single representative remote memory/storage device 1790 is shown in FIG. 17. The logical connections depicted in FIG. 17 include a local area network (LAN) 1793 and a wide area network (WAN) 1795. Such networking environments are often deployed, for example, in offices, enterprise-wide computer networks, intranets, and the Internet.

When used in a LAN networking environment, the computer system 1700 is connected to the local area network 1793 through a network interface or adapter 1796. When used in a WAN networking environment, the computer system 1700 typically includes a broadband modem 1798, network gateway, or other means for establishing communications over the wide area network 1795, such as the Internet. The broadband modem 1798, which may be internal or external, is connected to the system bus 1714 via a serial port interface 1771. In a networked environment, program modules related to the computer system 1700, or portions thereof, may be stored in the remote memory storage device 1790. It is noted that the network connections shown in FIG. 17 are illustrative and other means of establishing a communications link between the computers may be used depending on the specific requirements of an application of the present TPM attestation flow over Simple Authentication and Security Layer with multiple symmetric key identification.

Figure 18:
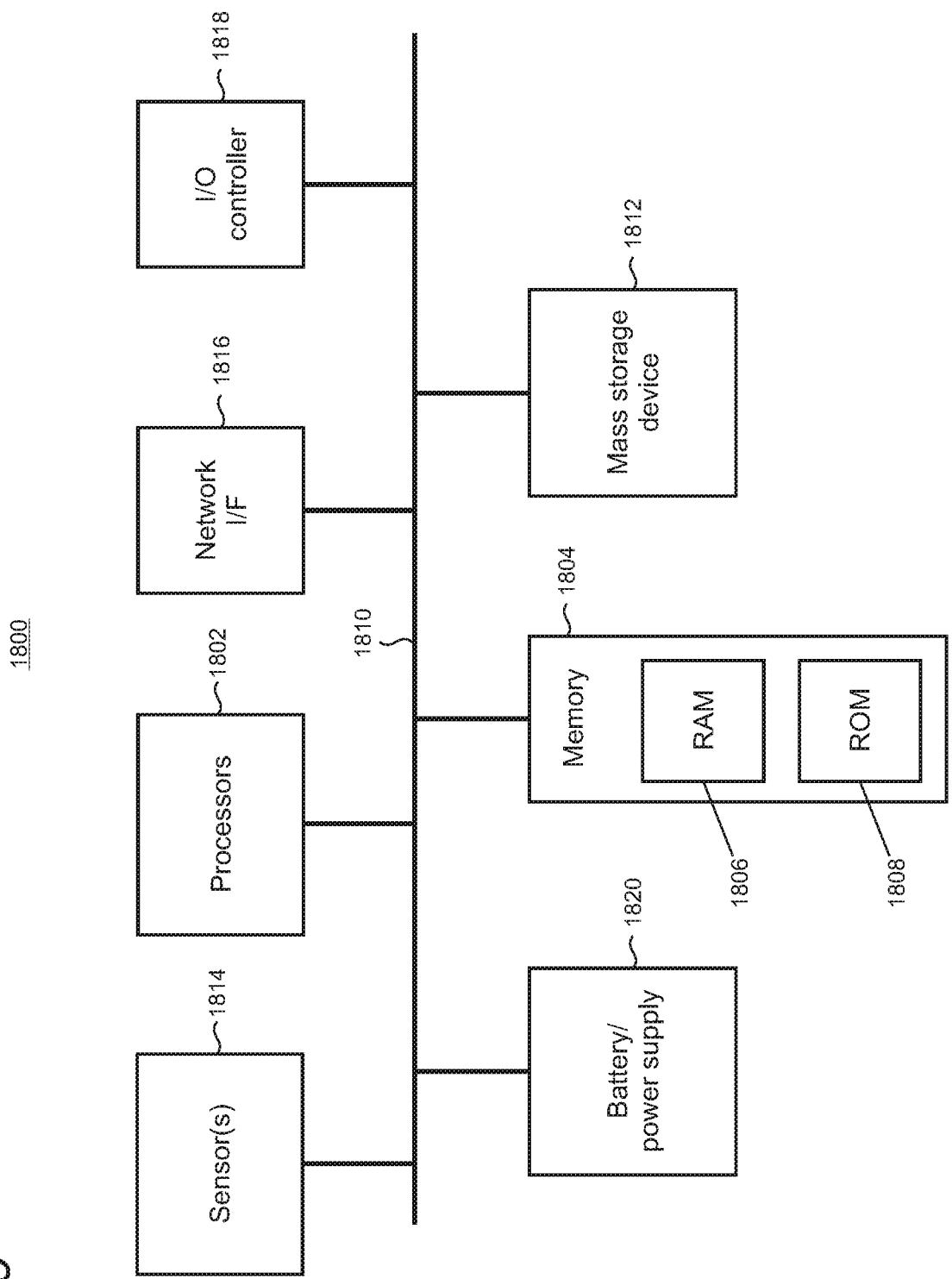
FIG. 18 is a simplified block diagram of an illustrative client computing device that may be used in part to implement the present TPM attestation flow over Simple Authentication and Security Layer with multiple symmetric key identification.

FIG. 18 shows an illustrative architecture 1800 for a computing device such as a laptop computer or personal computer, or an IoT device capable of executing the various components described herein for TPM attestation flow over Simple Authentication and Security Layer with multiple symmetric key identification. The architecture 1800 illustrated in FIG. 18 includes one or more processors 1802 (e.g., central processing unit, dedicated AI chip, graphics processing unit, etc.), a system memory 1804, including RAM (random access memory) 1806 and ROM (read only memory) 1808, and a system bus 1810 that operatively and functionally couples the components in the architecture 1800. A basic input/output system containing the basic routines that help to transfer information between elements within the architecture 1800, such as during startup, is typically stored in the ROM 1808. The architecture 1800 further includes a mass storage device 1812 for storing software code or other computer-executed code that is utilized to implement applications, the file system, and the operating system. The mass storage device 1812 is connected to the processor 1802 through a mass storage controller (not shown) connected to the bus 1810. The mass storage device 1812 and its associated computer-readable storage media provide non-volatile storage for the architecture 1800. Although the description of computer-readable storage media contained herein refers to a mass storage device, such as a hard disk or CD-ROM drive, it may be appreciated by those skilled in the art that computer-readable storage media can be any available storage media that can be accessed by the architecture 1800.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1800.

According to various embodiments, the architecture 1800 may operate in a networked environment using logical connections to remote computers through a network. The architecture 1800 may connect to the network through a network interface unit 1816 connected to the bus 1810. It may be appreciated that the network interface unit 1816 also may be utilized to connect to other types of networks and remote computer systems. The architecture 1800 also may include an input/output controller 1818 for receiving and processing input from a number of other devices, including a keyboard, mouse, touchpad, touchscreen, control devices such as buttons and switches or electronic stylus (not shown in FIG. 18). Similarly, the input/output controller 1818 may provide output to a display screen, user interface, a printer, or other type of output device (also not shown in FIG. 18).

It may be appreciated that the software components described herein may, when loaded into the processor 1802 and executed, transform the processor 1802 and the overall architecture 1800 from a general-purpose computing system into a special-purpose computing system customized to facilitate the functionality presented herein. The processor 1802 may be constructed from any number of transistors or other discrete circuit elements, which may individually or collectively assume any number of states. More specifically, the processor 1802 may operate as a finite-state machine, in response to executable instructions contained within the software modules disclosed herein. These computer-executable instructions may transform the processor 1802 by specifying how the processor 1802 transitions between states, thereby transforming the transistors or other discrete hardware elements constituting the processor 1802.

Encoding the software modules presented herein also may transform the physical structure of the computer-readable storage media presented herein. The specific transformation of physical structure may depend on various factors in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

The architecture 1800 may further include one or more sensors 1814 or a battery or power supply 1820. The sensors may be coupled to the architecture to pick up data about an environment or a component, including temperature, pressure, etc. The power supply may be adapted with an AC power cord or a battery, such as a rechargeable battery for portability.

In light of the above, it may be appreciated that many types of physical transformations take place in the architecture 1800 in order to store and execute the software components presented herein. It also may be appreciated that the architecture 1800 may include other types of computing devices, including wearable devices, handheld computers, embedded computer systems, smartphones, PDAs, and other types of computing devices known to those skilled in the art. It is also contemplated that the architecture 1800 may not include all of the components shown in FIG. 18, may include other components that are not explicitly shown in FIG. 18, or may utilize an architecture completely different from that shown in FIG. 18.

Various exemplary embodiments of the present trusted platform module attestation flow over Simple Authentication and Security Layer with multiple symmetric key identification are now presented by way of illustration and not as an exhaustive list of all embodiments. An example includes a method performed by a provisioning service during an authentication process using a Simple Authentication and Security Layer (SASL) framework, comprising: transmitting a challenge to a client computing device in response to receiving an authentication request; receiving one or more responses from the client computing device in response to the transmitted challenge, wherein the one or more responses include one or more public keys; and in response to receiving the one or more public keys, preparing a first segment challenge key for transmission to the client computing device, wherein the first segment challenge key is configured using the SASL framework and includes a control byte that defines attributes that are unique to the first segment challenge key, wherein the SASL framework is modified to support a challenge key that is separated into multiple segments, and the first segment challenge key is one of the multiple segments of the challenge key.

In another example, the public keys are uniquely associated with a trusted platform module (TPM) local to the client computing device. In another example, the method further includes receiving a Registration ID artifact from the client computing device, in which Registration ID is a value that identifies the client computing device. In another example, the method further includes preparing a second segment challenge key for transmission to the client computing device, in which the second segment challenge key is configured using the SASL framework and includes a control byte that defines attributes that are unique to the second segment challenge key. In another example, the control bytes contained in the first and second segment challenge keys are different, such that the control bytes respectively indicate a segment number for the first and second segment challenge keys. In another example, the provisioning service receives two public keys in two distinct messages from the client computing device, and further comprising: generating the challenge key by encoding both public keys; and separating the challenge key in multiple segments which include at least the first and second challenge key segments. In another example, the method further comprises: receiving a Shared Access Security (SAS) token after transmitting the entire challenge key in the multiple segments; and authenticating the client computing device using the SAS token. In another example, one or more bits within the control byte are assigned a value, and a respective bit or group of bits define different attributes about the first segment challenge key. In another example, attributes about the first segment challenge key defined by a bit or group of bits include a presence or absence of valid information within the control byte, whether the first challenge segment is an interim segment or a final segment, and a sequence number of the first segment challenge key.

A further example includes a client computing device comprised of: one or more processors; and one or more hardware-based memory devices storing computer-readable instructions which, when executed by the one or more processors, cause the client computing device to perform an attestation process with a provisioning service using a Simple Authentication and Security Layer (SASL) framework, in which the executed instructions further cause the client computing device to: configure an SASL INIT message with a control byte which defines message attributes including an indication that the SASL INIT message is one segment of a message having multiple segments; transmit the SASL INIT message; configure a response message which includes a public key in response to receiving a challenge to the SASL INIT message, wherein the response message is configured with a control byte that defines attributes about the response message; and transmit the response message.

In another example, the SASL INIT message and the response message each include distinct public keys. In another example, the distinct public keys include an endorsement key and a storage root key. In another example, the executed instructions further cause the client computing device to configure a second response message which includes a second public key in response to receiving a second challenge, in which the second response message is configured with a control byte that defines attributes about the second response message. In another example, the executed instructions further cause the client computing device to: after transmitting the public keys, receive a first segment challenge key; examine one or more bits within a control byte included in the first segment challenge key; based on the examination of the one or more bits, determine whether the first segment challenge key is an interim segment or a final segment; and when the first segment challenge key is an interim segment, then transmit an acknowledgment of receipt of the first segment challenge key. In another example, the executed instructions further cause the client computing device to: receive a second segment challenge key; examine one or more bits within a control byte included in the second segment challenge key; and when the second segment challenge key is a final segment, then decode the first and second segment challenge keys using a private key; generate a Shared Access Security (SAS) token using the decoded challenge keys; and transmit the SAS token. In another example, the executed instructions further cause the client computing device to receive a validation message responsive to the SAS token being validated by a provisioning service. In another example, the private key is associated with a trusted platform module that is local to the client computing device.

A further example includes one or more hardware-based non-transitory computer-readable memory devices storing instructions which, when executed by one or more processors disposed in a computing device, cause the computing device to: exchange messages with a remote computing device using a Simple Authentication and Security Layer (SASL) framework, in which the exchanging includes configuring messages with a control byte that is indicative of attributes for a message when read by the remote computing device upon receipt, and when a message to be transmitted is broken up into multiple segmented messages, configure the control byte to indicate whether a given message is an interim message or a final message of the multiple segmented messages.

In another example, the computing device includes any one of a computer server, a smartphone, a laptop computer, a desktop computer, a tablet computer, or an IoT (Internet of Things)-enabled device with network connectivity. In another example, the executed instructions further cause the computing device to: receive messages which contain control bytes; examine bits or groups of bits within a control byte for a respective message to determine when a final segmented message in a series of segmented messages is received; and combine each message of the segmented messages into a single message for utilization.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A client computing device, comprising:
one or more processors; and
one or more hardware-based non-transitory memory devices storing computer-readable instructions which, when executed by the one or more processors, cause the client computing device to perform an attestation process with a provisioning service using a Simple Authentication and Security Layer (SASL) framework, in which the executed instructions further cause the client computing device to:
configure an SASL INIT (initialization) message with a control byte which defines message attributes including an indication that the SASL INIT message is one segment of a message having multiple segments;
transmit the SASL INIT message;
configure a response message which includes a public key in response to receiving a challenge to the SASL INIT message, wherein the response message is configured with a control byte that defines attributes about the response message;
transmit the response message;
after transmitting the public keys, receive a first segment challenge key;
examine one or more bits within a control byte included in the first segment challenge key;
based on the examination of the one or more bits, determine whether the first segment challenge key is an interim segment or a final segment;
when the first segment challenge key is an interim segment, then transmit an acknowledgment of receipt of the first segment challenge key; and
use the first segment challenge key in the attestation process in which a Shared Access Security (SAS) token is generated and transmitted to the provisioning service to authenticate the client computing device.

2. The client computing device of claim 1, in which the SASL INIT (Simple Authentication and Security Layer initialization) message and the response message each include distinct public keys.

3. The client computing device of claim 2, in which the distinct public keys include an endorsement key and a storage root key.

4. The client computing device of claim 1, in which the executed instructions further cause the client computing device to configure a second response message which includes a second public key in response to receiving a second challenge, in which the second response message is configured with a control byte that defines attributes about the second response message.

5. The client computing device of claim 1, in which the executed instructions further cause the client computing device to:
receive a second segment challenge key during the attestation process;
examine one or more bits within a control byte included in the second segment challenge key;
when the second segment challenge key is a final segment, then decode the first and second segment challenge keys using a private key;
generate the SAS token using the decoded segment challenge keys; and
transmit a control byte in the SAS token to indicate that the SAS token comprises a last message to be read by the provisioning service in the attestation process.

6. The client computing device of claim 5, in which the executed instructions further cause the client computing device to receive a validation message responsive to the SAS token being validated by the provisioning service.

7. The client computing device of claim 5, in which the private key is associated with a trusted platform module that is local to the client computing device.

8. One or more hardware-based non-transitory computer-readable memory devices storing instructions which, when executed by one or more processors disposed in a client computing device, cause the client computing device to perform an attestation process with a provisioning service using a Simple Authentication and Security Layer (SASL) framework, in which the executed instructions further cause the client computing device to:
configure an SASL INIT (initialization) message with a control byte which defines message attributes including an indication that the SASL INIT message is one segment of a message having multiple segments;
transmit the SASL INIT message;
configure a response message which includes a public key in response to receiving a challenge to the SASL INIT message, wherein the response message is configured with a control byte that defines attributes about the response message;
transmit the response message;
after transmitting the public keys, receive a first segment challenge key;
examine one or more bits within a control byte included in the first segment challenge key;
based on the examination of the one or more bits, determine whether the first segment challenge key is an interim segment or a final segment;
when the first segment challenge key is an interim segment, then transmit an acknowledgment of receipt of the first segment challenge key; and
use the first segment challenge key in the attestation process in which a Shared Access Security (SAS) token is generated and transmitted to the provisioning service to authenticate the client computing device.

9. The one or more hardware-based non-transitory computer-readable memory devices of claim 8, in which the SASL INIT (Simple Authentication and Security Layer initialization) message and the response message each include distinct public keys.

10. The one or more hardware-based non-transitory computer-readable memory devices of claim 9, in which the distinct public keys include an endorsement key and a storage root key.

11. The one or more hardware-based non-transitory computer-readable memory devices of claim 8, in which the executed instructions further cause the client computing device to configure a second response message which includes a second public key in response to receiving a second challenge, in which the second response message is configured with a control byte that defines attributes about the second response message.

12. The one or more hardware-based non-transitory computer-readable memory devices of claim 8, in which the executed instructions further cause the client computing device to:
receive a second segment challenge key during the attestation process;
examine one or more bits within a control byte included in the second segment challenge key;
when the second segment challenge key is a final segment, then decode the first and second segment challenge keys using a private key;
generate the SAS token using the decoded segment challenge keys; and
transmit a control byte in the SAS token to indicate that the SAS token comprises a last message to be read by the provisioning service in the attestation process.

13. The one or more hardware-based non-transitory computer-readable memory devices of claim 12, in which the executed instructions further cause the client computing device to receive a validation message responsive to the SAS token being validated by the provisioning service.

14. The one or more hardware-based non-transitory computer-readable memory devices of claim 12, in which the private key is associated with a trusted platform module that is local to the client computing device.

15. A method by which a client computing device performs an attestation process with a provisioning service using a Simple Authentication and Security Layer (SASL), comprising:
configuring an SASL INIT (initialization) message with a control byte which defines message attributes including an indication that the SASL INIT message is one segment of a message having multiple segments;
transmitting the SASL INIT message;
configuring a response message which includes a public key in response to receiving a challenge to the SASL INIT message, wherein the response message is configured with a control byte that defines attributes about the response message;
transmitting the response message;
after transmitting the public keys, receiving a first segment challenge key;
examining one or more bits within a control byte included in the first segment challenge key;
based on the examination of the one or more bits, determining whether the first segment challenge key is an interim segment or a final segment;
when the first segment challenge key is an interim segment, then transmitting an acknowledgment of receipt of the first segment challenge key; and
using the first segment challenge key in the attestation process in which a Shared Access Security (SAS) token is generated and transmitted to the provisioning service to authenticate the client computing device.

16. The method of claim 15, in which the SASL INIT (Simple Authentication and Security Layer initialization) message and the response message each include distinct public keys.

17. The method of claim 16, in which the distinct public keys include an endorsement key and a storage root key.

18. The method of claim 15, further including configuring a second response message which includes a second public key in response to receiving a second challenge, in which the second response message is configured with a control byte that defines attributes about the second response message.

19. The method of claim 15, further including:
receiving a second segment challenge key during the attestation process;
examining one or more bits within a control byte included in the second segment challenge key;
when the second segment challenge key is a final segment, then decoding the first and second segment challenge keys using a private key;
generating the SAS token using the decoded segment challenge keys; and
transmitting a control byte in the SAS token to indicate that the SAS token comprises a last message to be read by the provisioning service in the attestation process.

20. The method of claim 19, further including receiving a validation message responsive to the SAS token being validated by a provisioning service.

* * * * *